March 25, 1969 R. W. KLEINE ET AL 3,434,212
MACHINE CONTROL FOR CUTTING GEOMETRIC SHAPES
Filed June 30, 1966 Sheet 1 of 3
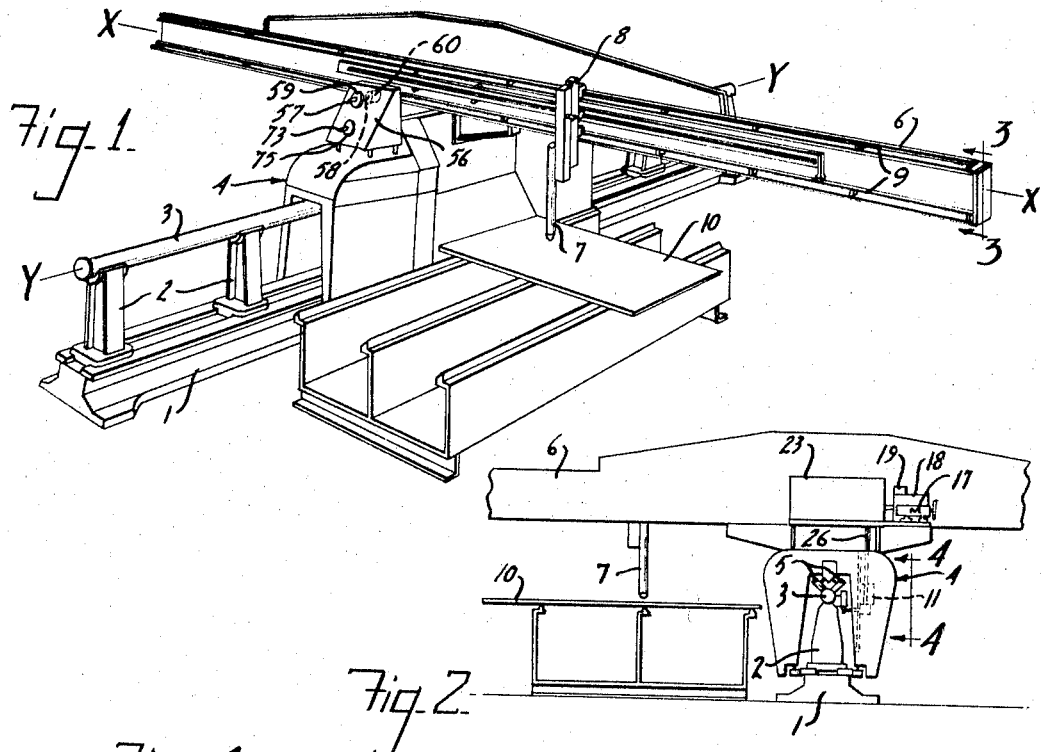
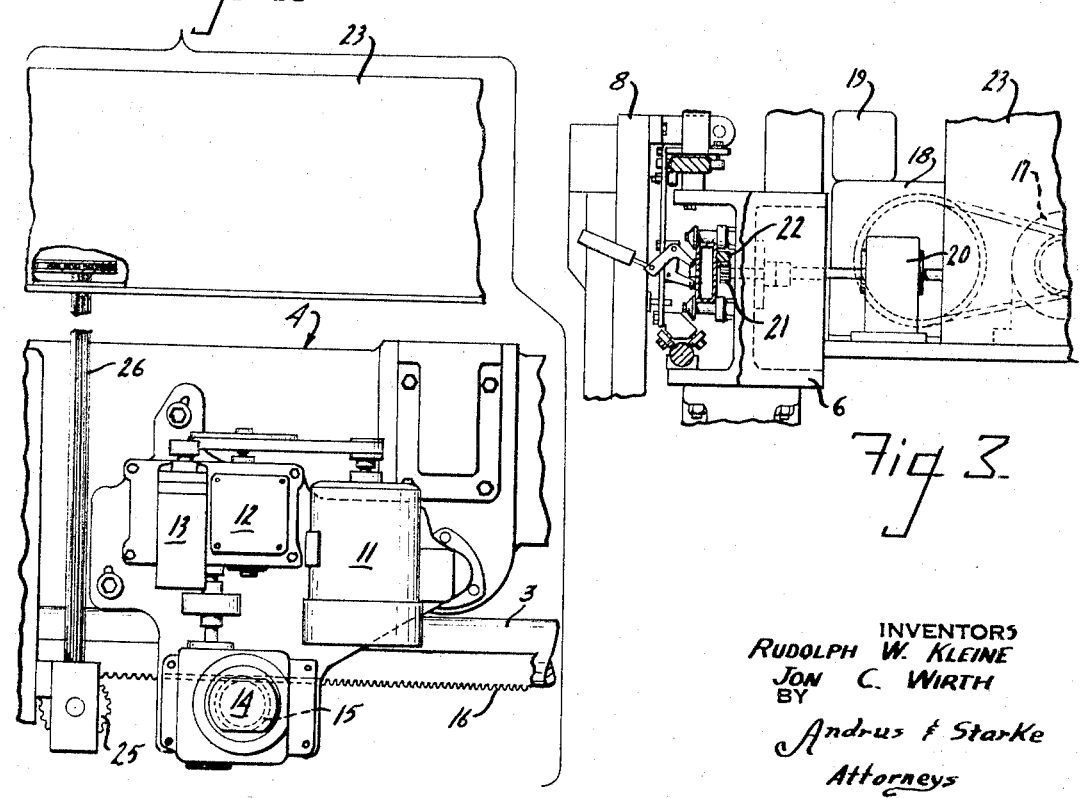
INVENTORS
RUDOLPH W. KLEINE
JON C. WIRTH
BY
Andrus & Starke
Attorneys

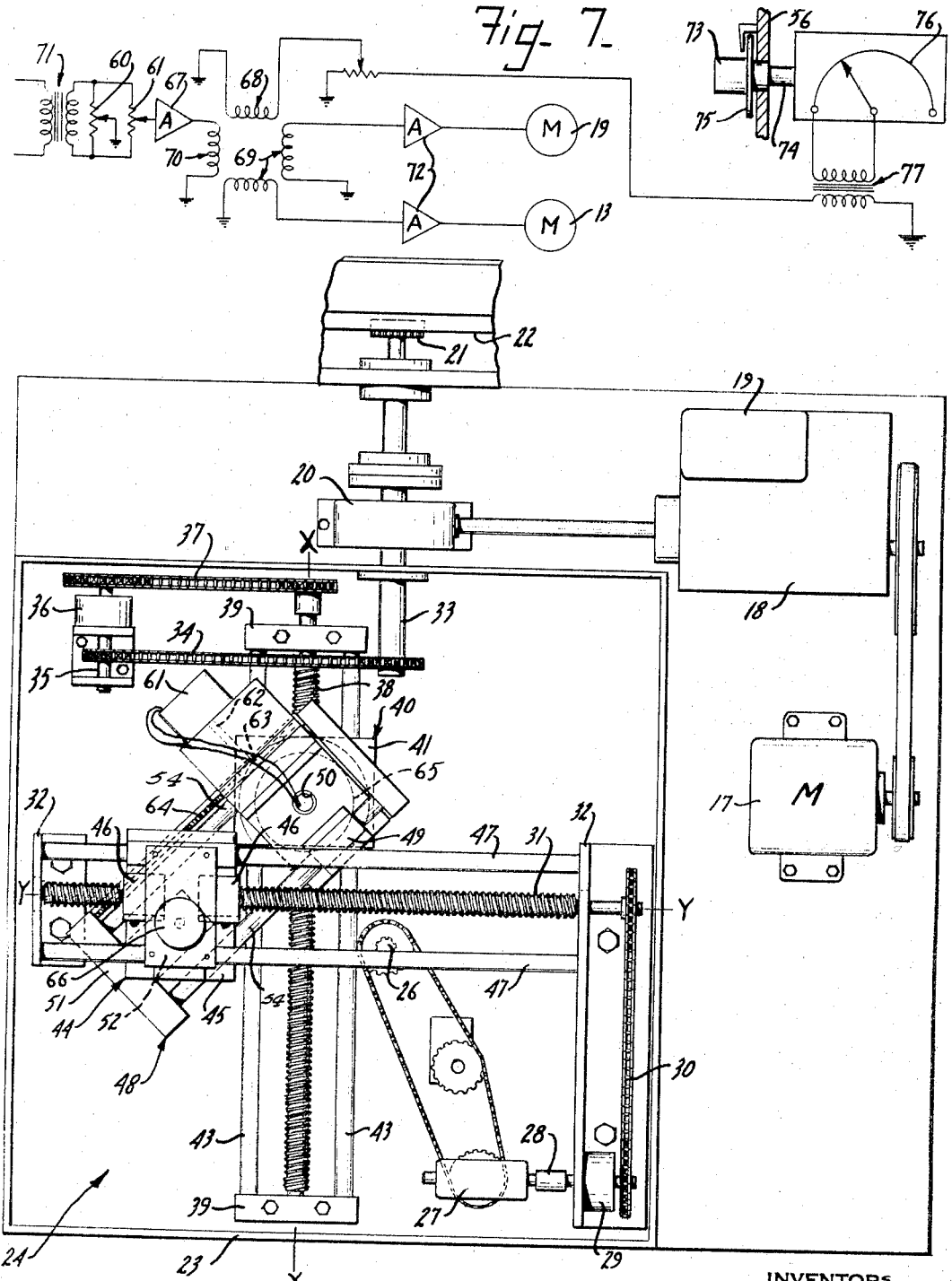

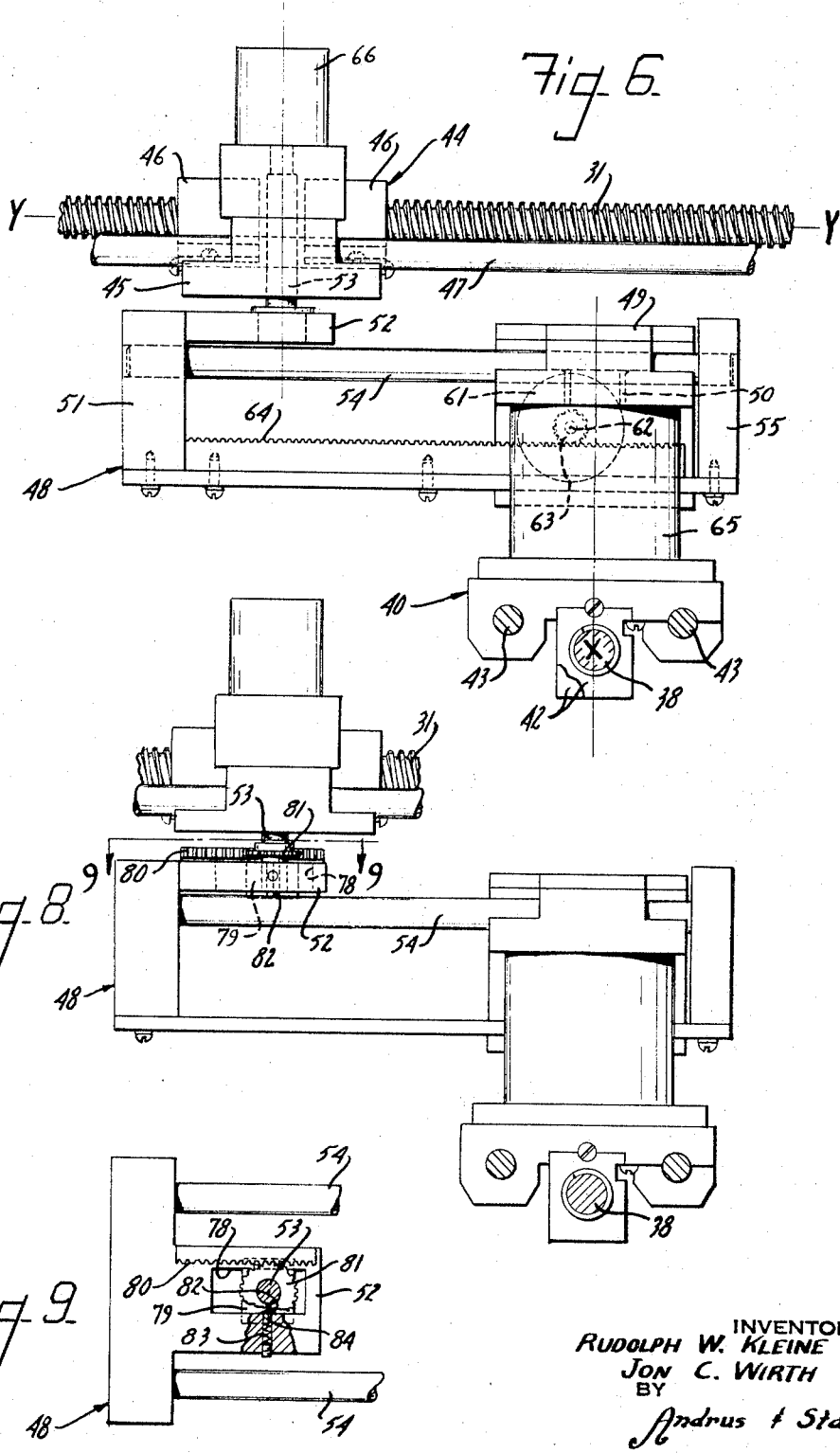

United States Patent Office 3,434,212
Patented Mar. 25, 1969

3,434,212
MACHINE CONTROL FOR CUTTING GEOMETRIC SHAPES
Rudolph W. Kleine and Jon C. Wirth, Wauwatosa, Wis., assignors, by mesne assignments, to C.R.O. Engineering Co. Inc., Brookfield, Wis., a corporation of Wisconsin
Filed June 30, 1966, Ser. No. 561,771
Int. Cl. B43l *11/00*
U.S. Cl. 33—27                   13 Claims

ABSTRACT OF THE DISCLOSURE

A metal cutting machine has a carriage mounted for movement in a Y direction and a tool support on the carriage for movement in an X direction. A circle generator is mounted on the carriage and has elements on a reduced scale which correspond to the carriage drive and tool support drive. The circle generator is connected to these drives through a loop arrangement which includes an electromechanical resolver having an output responsive to the circle generator position and which feeds said drives. Error correction means affect the output of the resolver. Remote control means are provided for the generator which selectively determine the size of the circle generated.

---

This invention relates to a machine control for cutting geometric shapes. More particularly, the invention relates to a tool path generator for use in a machine tool which provides a high degree of cutting accuracy.

Generally in accordance with the invention, a circle generator is utilized to generate a circular motion and control the movements of a tool, such as a cutting torch, to thereby cause the tool to reproduce the motion in a prescribed ratio. The generator includes means complementary to the machine axes for creating movements of the tool or tools relative to the axes. In addition, a servo-loop is provided to correct for any tendency of the tool to stray from its intended path.

The accompanying drawings illustrate the best mode presently contemplated by the inventors for carrying out the invention.

In the drawings:

FIGURE 1 is a perspective view of a machine having the invention embodied therein;

FIG. 2 is a rear elevation of the portion of the machine and showing the carriage mounting;

FIG. 3 is a view taken on line 3—3 of FIGURE 1 and with parts in section and showing the X drive;

FIG. 4 is a view taken generally on line 4—4 of FIG. 2 and showing the Y drive;

FIG. 5 is a top plan view of the circle generating mechanism;

FIG. 6 is a side elevation of the circle generator of FIG. 5, with certain parts shifted in position for purposes of clarity;

FIG. 7 is a schematic diagram of the electrical circuit utilized in connection with the invention;

FIG. 8 is a view similar to FIG. 6 and showing a second embodiment; and

FIG. 9 is a section taken on line 9—9 of FIG. 8.

As shown in FIGURES 1 to 4 of the drawings, the invention may be embodied in a flame cutting machine, although other types of cutting machines may be utilized without departing from the spirit of the invention. The machine shown in the drawings comprises a base 1 of cast or other suitable design. Base 1 includes pedestal 2 which in turn supports an elongated guide rail 3. Rail 3 extends in the longitudinal or Y axis direction.

A main carriage 4 is mounted for longitudinal movement on rail 3. For this purpose, and as best shown in FIG. 2, carriage 4 includes a plurality of pairs of angled guide rollers 5 which engage rail 3 and rollingly support the carriage thereon.

Carriage 4 includes and fixedly supports an elongated cross-beam 6 which extends in the transverse or X direction. A suitable cutting tool, such as a torch 7, is mounted for movement along cross-beam 6 in the X direction. For this purpose, a saddle 8 is disposed to move along suitable upper and lower guide rails 9. The details of the saddle mounting are not shown, any well-known structure being suitable.

Torch 7 is carried by saddle 8 and is adapted to cut a generally horizontal fixed workpiece 10 to a configuration dictated by the controls to be described. Suitable angular and vertical torch adjustment means may be provided, as well as an igniting and flame control system, in accordance with structures well known in the art. While a plurality of saddle and torch combinations are usually utilized in a machine, only one such combination is shown in the drawings for purposes of clarity.

Means are provided for driving main carriage 4 in the Y direction on base 1. For this purpose, a main drive motor 11 is mounted on carriage 4. Motor 11 may be connected to the input of a torque amplifier 12, the output of which is variably controlled by a servo-motor 13. This output is then connected through a suitable gear box 14 to a carriage drive pinion 15, which in turn meshes with a longitudinal rack 16 fixed to pedestal 2 and extending adjacent and parallel to guide rail 3. Depending upon the control exercised by servo-motor 13, motor 11 will drive carriage 4 along rail 3 at varying speeds and in both directions.

Similar means are also provided for moving saddle 8 in the X direction on cross-beam 6. In this instance, a torch drive motor 17 is secured to cross-beam 6, and may drive through a torque amplifier 18 controlled by a servo-motor 19, and hence through a gear box 20 to a pinion 21. O transverse rack 22 is engaged by pinion 21 for moving the rack and saddle at varying speeds in both directions.

In accordance with the invention, means are provided to independently and automatically generate curved contours, such as circles, in the tool drive. For this purpose, and as best shown in FIGURES 4 and 5, a housing 23 is fixedly mounted on main carriage 4. Housing 23 contains the circle generator, indicated generally at 24. Generator 24 contains mechanism which generally corresponds to the basic machine tool operating structure, only on a reduced scale, such as 1/10.

For purposes of the invention, a second pinion 25 is disposed in meshing engagement with pedestal rack 16, and is mounted to move longitudinally with carriage 4. Pinion 25 is connected through a vertical splined shaft 26 and a chain drive to a gear box 27 within housing 23. The output shaft 28 of box 27 contains a clutch 29 which may be suitably actuated, and is connected through a chain 30 to one end of a screw 31 which is rotatably mounted in suitable brackets 32 within housing 23. Screw 31 corresponds to pedestal rail 3 in that it represents the Y direction of machine movement.

A second drive system is employed for circle generator 24 in connection with the X coordinates of the machine. For this purpose, gear box 20 has a second output shaft 33 which extends horizontally through the wall of housing 23 and is connected through a chain 34 to a stub shaft 35 having therein a suitable clutch 36 similar to clutch 29. The output of clutch 36 is in turn connected through a chain 37 to one end of a screw 38 which is rotatably mounted in suitable brackets 39 within the housing. Screw 38 corresponds to cross-beam 6 in that it represents the X direction of machine movement.

Screws 31 and 38 are disposed at 90° to each other, just as rail 3 and beam 6 are. It need not be necessary for the screws to be disposed in actual parallelism with rail 3 and beam 6 to perform their intended function. In fact, in the embodiment shown, they are at right angles to their corresponding machine counterparts, due to the particular drive train utilized. Other drive connections may be used wherein the screws are parallel to or at any other angle to rail 3 and beam 6 without departing from the spirit of the invention.

As carriage 4 and torch saddle 8 move in their respective directions and at their respective speeds, screws 31 and 38 will be rotated in corresponding directions and speeds through the above described drive, at a suitably reduced ratio.

In accordance with the invention, circle generator 24 also includes structure corresponding in general to carriage 4 and saddle 8. For this purpose, and as best shown in FIGURES 5 and 6, a carriage assembly is mounted for reciprocating movement on each screw. Carriage assembly 40 is mounted on X coordinate screw 38 and comprises a frame 41 secured to a pair of suitable antibacklash ball nuts 42 through which screw 38 extends.

As screw 38 turns, assembly 40 will move therealong and along a pair of spaced guide rods 43 which are fixedly mounted to brackets 39 and disposed on each side of screw 38.

Likewise, a carriage assembly 44 is mounted for reciprocating movement on Y coordinate screw 31 and comprises a frame 45 mounted on suitable antibacklash ball nuts 46 through which screw 31 extends. A pair of spaced guide rods 47 fixedly mounted to brackets 32 support assembly 44 during its movement along screw 31.

For purposes of circle generation, carriage assemblies 40 and 44 are mechanically joined by a radius bar connector assembly 48. This assembly comprises a block 49 which is fixedly mounted on a tube-like shaft 50 which extends downwardly into carriage frame 41 and which is rotatable about a vertical axis for purposes to be described. A second block 51 is disposed within housing 23 and is provided with a lip 52 which is fixedly secured to the lower end of a shaft 53 which extends upwardly through carriage frame 45. Block 51 and shaft 53 are rotatable together about the vertical shaft axis for purposes to be described.

A pair of spaced parallel connector rods 54 extend through and between blocks 49 and 51, and are secured together at their ends at block 51 and at a suitable bracket 55. Rods 54 are fixedly attached to block 51 to prevent linear movement relative to the axis of shaft 53, but are loosely disposed within block 49 to permit linear movement thereof relative to the axis of shaft 50.

During operation of the circle generator, carriage assemblies 40 and 44 will move to different relative positions on screws 31 and 38. As this movement occurs, connector assembly 48 will describe compound curving movements about shafts 50 and 53, depending upon the relative positions, directions of movement and speed rates of the carriage assemblies.

The radius of the circle to be generated, and thus machined by the tool, is dependent on the horizontal distance between the vertical axes of shafts 50 and 53. See FIG. 6. Thus, with a 1/10 ratio of circle generator size to machine size, the distance between shaft axes is one tenth the radius of the desired cut.

In accordance with the invention, control means remote from the tool and generator are provided to selectively set the generator to the desired radius size. For this purpose, a control panel 56 is disposed on carriage 4 at the front of the machine. Panel 56 may have thereon the usual dials and switches for actuating the torches when flame cutting tools are used, for controlling motors 11 and 17 as desired, etc. In addition, a radius set knob 57 is mounted on panel 56. Knob 57 is connected through a suitable shaft 58 to a visual dial 59 calibrated in length measurements for the radius desired. The inner end of shaft 58 forms the rotary portion of a panel-mounted potentiometer 60 which forms part of the electrical control circuit to be described hereinafter. Potentiometer 60 is, in turn, connected electrically to a similar potentiometer 61 mounted on the side of connector assembly block 49 in the circle generator. The output shaft 62 of potentiometer 61 has a pinion 63 thereon which meshes with a rack 64 extending parallel to connector rods 54 and between block 51 and bracket 55.

When radius dial 59 is manually set for, say, a 30 inch cut, potentiometers 60 and 61 will operate in a manner to be described to cause the distance between the axes of shafts 50 and 53 to be 3 inches. Other ratios may be utilized without departing from the spirit of the invention.

Since potentiometer 61 is mounted on a rotatable body, the electrical connection is through a suitable slip-ring assembly 65 which includes the lower end of tube-like shaft 50.

The drive connection between circle generator 24 and the main machine includes a resolver 66 which is disposed atop Y coordinate carriage assembly frame 45. Resolver 66 has the usual rotatable shaft which extends downwardly through frame 45 and actually forms the upper portion of shaft 53.

Resolver 66 is of the well-known sine-cosine syncro type having a two-phase rotor and two-phase stator. The indexed position of the resolver shaft is utilized to create an electrical output which is divided into X and Y coordinate voltage signals. Generally, the signals corresponding to X and Y coordinate speed and direction are fed to servo-motors 19 and 13, respectively. Since these servo-motors respectively govern the speed and direction of movement of carriage 4 and saddle 8, resolver 66 actually is the primary control therefor. In addition, since servo-motors 19 and 13 are connected to drive circle generator 24, an electro-mechanical loop is provided through the system.

Assuming that panel dial 59 is set for the desired radius, with the resultant radius setting of generator 24, motors 11 and 17 are energized to drive the machine carriage and torch saddle. At the same time, due to the loop, screws 31 and 38 will be actuated, thereby causing X and Y carriage assemblies 40 and 44 to move in the X and Y directions. As this occurs, radius bar connector assembly 48 will describe compound curving movements within the generator, and will pivot about the axes of shafts 50 and 53. As this occurs, and since block lip 52 is fixed to resolver shaft 53, shaft 53 will index, thereby changing the X and Y voltage outputs of resolver 66 in a sine-cosine manner. The changing outputs will in turn be fed to servo motors 19 and 13, which in turn control the machine and circle generator drives. The loop control is continuous.

The action of circle generator 24 includes continually varying screw speeds, and directions as determined by the indexed position of resolver rotor shaft 53 and the magnitude and phase of the electrical signals fed to the resolver rotor.

In machining circles of different sizes on the same or similar stock, the same cutting rate per inch should be used. Thus, if the circle generator is set for a large radius, the rate of turn of resolver shaft 53 will be slower than if the setting is for a small radius. The corresponding tool drive will respond accordingly.

Due to manufacturing tolerances, backlash and other problems inherent in any machine and its servo drives, a tool describing a circle may tend to stray off course during its movement. For example, errors can be caused by a slight inaccuracy in the machine drives, such as in gear boxes 14 and 20. In accordance with the invention, means are provided to correct for such errors and to return the tool to the proper path instantaneously if an error occurs.

Any errors in the main tool drive will be reflected in the drive of circle generator 24. In the case of the cutting tool, straying from the proper path means a change in cutting radius of the tool. In the case of the circle generator, the inaccuracy will result in incorrect relative speeds of screws 31 and 38. This in turn will cause a pressure or force tending to alter the radius; i.e., the distance between the axes of shafts 50 and 53. Connector assembly 48 will be forced linearly toward a position changing this distance, and the movement of rack 64 with the assembly will cause shaft 62 of potentiometer 61 to turn. Potentiometer 61 is thus, in effect, a position feedback transducer.

Immediately upon shifting the setting of potentiometer 61, its output will no longer balance the output of panel potentiometer 60, which is the normal condition.

Potentiometers 60 and 61 are connected in parallel, as best shown in FIG. 7, with the circuit leading to a circle null amplifier 67. When the potentiometers are in normal balance, no signal is fed to amplifier 67. However, if an error occurs in the system, and the potentiometers become unbalanced, a signal is then fed to the amplifier.

Resolver 66 is provided with a rotor having two types of windings. One set of windings 68 are for controlling the feed rate and provide signals to the resolver X and Y stator windings 69 in accordance with the position of resolver shaft 53. A second set of rotor windings 70 are disposed at 90° to windings 68, and are connected to the output of amplifier 67 for correction purposes. Thus, when the amplifier output reflects an unbalanced potentiometer condition, correction windings 70 will feed the signal to stator windings 69. The output of windings 69 is, of course, connected to servo-motors 13 and 19 and will thus feed the correction signal to them for repositioning the tool on the proper radius. At the same time, the system loop will cause a correction in the drive to generator screws 31 and 38 so that shafts 50 and 53 again represent the proper radius. Potentiometers 60 and 61 will again be in balance with no correction signal emanating from amplifier 67.

Likewise, if for some reason mechanical inaccuracies occur within circle generator 24, these will be reflected in an improper rotative positioning of resolver shaft 53. The resolver output signals to servo-motors 13 and 19 will then not be commensurate with the desired radius setting. The inaccuracy will show up in the machine drive which will unbalance the potentiometers and cause the correcting action described above to be taken.

In the schematic electrical diagram of FIG. 7, a power supply transformer 71 feeds potentiometer 60 and 61, the combined output of which is fed to amplifier 67. The output of amplifier 67 feeds to correction windings 70 of the resolver rotor shaft 53. The X and Y resolver stator windings 69 in turn are connected through servo amplifiers 72 to servo-motors 19 and 13.

In addition, feed rate control is provided at panel 56. For this purpose, a feed rate knob 73 is connected to a shaft 74 having a dial 75 thereon which is suitably calibrated, such as in inches per second. Shaft 74 controls a rheostat-like device 76 which is connected through a suitable transformer 77 to the feed rate rotor windings 68 of resolver 66. The feed rate control thus varies the strength of the voltage signal fed to the resolver windings 68 to thereby adjust for the rate of movement of torch 7.

Although the machine control device is primarily a circle generator, resetting of the device to a new radius can be accomplished in a straight line. For this purpose, assume that the feed rate setting of dial 75 is at zero, or that the power to windings 68 is shut off. A sudden manual shift of panel potentiometer 60 will introduce an unbalance signal in amplifier 67, and the error correction system described above will function to bring torch 7 to the new radius. This will be a straight line movement since no feed rate signal will be fed to the resolver output from windings 67. Torch movement will stop when the desired radius is reached.

In addition, if a feed rate signal is being introduced into the system through resolver 66, a change in the radius dial setting will cause the torch to describe a spiral which merges into the circle desired when the set radius is reached. This is due to the combination of feed rate and error signals at the resolver. The pitch of the spiral will depend on the ratio of the speed at which knob 57 is turned to the speed at which the machine can follow a change in setting.

FIGS. 8 and 9 show an alternate embodiment, wherein the electrical type of error correction is replaced by a substantially mechanical system. In this embodiment, potentiometers 60 and 61 are only used for circle sizing, and not for position feedback purposes. Block lip 52 of connector assembly 48 is of substantial thickness and is provided with an elongated slot 78 extending parallel to rods 54 and along a line which passes through the axes of shafts 50 and 53. A sleeve 79 is fixedly secured to the lower end of resolver shaft 53 and forms a correction slide adapted to slide along the elongated edges of slot 78. A rack 80 is fixedly mounted on lip 52 and faces toward slot 78 and meshes with a pinion 81 fixedly secured to shaft 53.

As before, if torch 7 tends to stray from its proper position, the error will be reflected in the drive for screws 31 and 38, causing connector assembly rods 54 to slide in block 49, since the radius setting tends to change. Such sliding will cause rack 80 to move relative to resolver shaft 53, thus turning pinion 81 and shaft 53. Indexing of shaft 53 will change the output of resolver 66 and the error will thus be corrected as described hereinafter.

This embodiment differs from the first embodiment in that the resolver output is changed for correction purposes by mechanical indexing of the feed rate windings 68, rather than by an electrical nonrotative signal being superimposed on these windings.

The embodiment of FIGS. 8 and 9 also include mechanical means tending to fixedly maintain the radius setting of the circle generator, and to return the generator to that setting if an error is introduced into the system. For this purpose, a detent 82 is disposed in the side of sleeve 79. A compression spring 83 is disposed in a suitable chamber in lip 52, and biases a ball 84 into detent 82 at the normal setting. During error correction, ball 84 will tend to move out of detent 82, and the biasing force of spring 83 will tend to counteract this movement and prevent any floating motion of carriage assembly 44 relative to carriage assembly 40. As an error is corrected, ball 84 will snap back into place to help hold the desired setting.

Motors 11 and 17 may be of the constant speed single direction type, since all of the device's functions, both as to speed and direction, are dictated by servo-motors 13 and 19. While the embodiments disclosed herein disclose use of torque amplifiers 12 and 18, these merely amplify the drive motor torque and could be eliminated from the drive train without departing from the spirit of the invention.

The present invention is directed to a unique machine control utilizing an electromechanical tool path generator mounted on the machine and having parts which generally correspond to those of the machine itself. A drive loop is provided between the machine and the controls, with the axes of motion of the generator corresponding to those of the machine, only on a reduced scale.

In addition, means are provided to correct errors introduced anywhere into the system. When a resolver type control is utilized, the correction means may rely on either electrical or mechanical actuation of the resolver output.

Various modes of carrying out the invention are contemplated as being within the scope of the following claims and particularly pointing out and distinctly claiming the subject matter which is regarded as the invention.

We claim:
1. In a control for an apparatus having elements forming a support for a tool with said support being movable in X and Y coordinate directions:
   (a) an electromechanical circle generator mounted on said apparatus and having mechanical generator elements movable in X and Y directions corresponding to said apparatus elements on a reduced scale,
   (b) control means remote from and connected to said generator for selectively varying the radius of the circle generated thereby,
   (c) mechanical drive means connected between said apparatus elements and said generator elements for moving the generator elements in correspondence with movement of the apparatus elements,
   (d) electromechanical drive means connected between said generator elements and said apparatus elements for moving the apparatus elements in correspondence with movement of the generator elements,
   (e) and means responsive to an error in position of any of said elements relative to the position of the other elements for substantially immediately correcting said error.

2. The control of claim 1
   (a) in which said electromechanical drive means includes a resolver disposed on one of said generator elements, said resolver having an output responsive to the position of said generator elements,
   (b) and said error correction means includes means to supply a signal to said resolver output in response to said positional error.

3. In a control system for a machine:
   (a) a machine base,
   (b) a machine carriage mounted for movement on said base,
   (c) carriage drive means for moving said carriage in a Y direction along said base,
   (d) a tool support mounted for movement on said carriage,
   (e) tool drive means for moving said tool support in an X direction on said carriage,
   (f) a circle generator fixedly mounted on said carriage with said generator having inputs and an output and having elements corresponding to said carriage and said tool support,
   (g) said generator including means mounting said elements for movement in respective Y and X directions corresponding to the movements of said carriage and tool support,
   (h) servo means connecting said machine and said circle generator and comprising:
      (1) control means respectively connected between the output of said generator and both said drive means (c) and (e) for actuating both said last-named drive means in accordance with the operation of said generator,
      (2) and feedback means responsive to driving of said carriage and tool support by the drive means (c) and (e) and respectively connected to the inputs of said generator for moving the said element mounting means,
   (i) and means responsive to a positional error in said tool support and operable through said servo means and said generator for substantially immediately correcting said error.

4. In a control system for a machine:
   (a) a machine base,
   (b) a machine carriage mounted for movement on said base,
   (c) carriage drive means for moving said carriage in a Y direction along said base,
   (d) a tool support mounted for movement on said carriage,
   (e) tool drive means for moving said tool support in an X direction on said carriage,
   (f) a circle generator fixedly mounted on said machine carriage, said generator comprising:
      (1) first and second generator carriage assemblies corresponding to said machine carriage and said tool support respectively, with said generator carriage assemblies being mounted for movement in Y and X directions which correspond respectively to the Y and X directions of movement of said machine carriage and tool support,
      (2) said generator carriage assemblies forming a pair of parallel axes which are spaced apart a distance corresponding to the length of radius of the circle to be described by the tool support,
      (3) generator drive means connected and disposed to move said generator carriage assemblies in said Y and X directions,
      (4) connector means extending between said generator carriage assemblies and adapted to pivot about both said parallel axes during movement of the assemblies,
      (5) and a resolver mounted on one of said assemblies with said resolver having a rotor shaft indexable in response to pivoting of said connector means about one of said axes,
      (6) said resolver having an output responsive to the position of said rotor shaft,
   (g) servo means connecting said machine and said circle generator and comprising:
      (1) a connection between the output of said resolver and said drive means (c) and (e) for actuating both said last-named drive means in accordance with the indexed position of said resolver shaft,
      (2) and feedback means responsive to driving of said machine carriage and tool support by the drive means (c) and (e) and respectively connected to the generator drive means for actuating the latter,
   (h) and means responsive to a positional error in said tool support and operable through said servo means and said generator for substantially immediately correcting said error.

5. The control of claim 4 in which the distance between the parallel axes of said generator carriage assemblies is responsive to the said feedback means, and in which said error correcting means (h) comprises:
   (a) a manually settable transducer having an output responsive to the manual setting thereof,
   (b) a position feedback transducer mounted on said connector means and having an output responsive to the distance between said axes,
   (c) the outputs of said transducers normally being in balance,
   (d) a change in the distance between said axes causing the output of said position feedback transducer to become out-of-balance with the output of said manually settable transducer,
   (e) and means to feed information as to unbalance between said transducer outputs to said resolver,
   (f) said resolver being operable to provide an output responsive to receipt of said unbalance information.

6. The control of claim 5 in which:
   (a) said resolver is of the sine-cosine syncro type with an electrical output and having both an electromechanical and an electrical input,
   (b) the electromechanical input of said resolver being effected by pivoting of said connector means,
   (c) said transducers comprising potentiometers connected in parallel, with the combined outputs thereof being connected to the electrical input of said resolver, so that the error correction information due to potentiometer unbalance is transferred to said resolver output,

7. The control of claim 5:
 (a) in which said connector means includes a member linearly movable to the said resolver shaft and its related generator carriage assembly and axis, but linearly fixed relative to the other generator carriage assembly and axis, so that a change in the distance between said axes causes said member to move linearly,
 (b) said position feedback transducer being mounted so that its output is responsive to linear movement of said member.

8. The control of claim 4:
 (a) in which said connector means includes a member movable linearly relative to the said resolver shaft and its related generator carriage assembly and axis, but linearly fixed relative to the other generator carriage and axis, so that a change in the distance between said axes causes said member to move linearly from a normal position,
 (b) said error correcting means comprising: means to index said resolver rotor shaft in response to linear movement of said member.

9. The control of claim 8 in which said indexing means comprises:
 (a) a rack on said connector means member,
 (b) a pinion meshing with said rack and connected with said resolver rotor shaft for indexing the latter in response to linear movement of said member from its normal position,
 (c) and means biasing said member toward its normal position.

10. The control of claim 9 in which said biasing means comprises:
 (a) slot means in said connector means member,
 (b) error correction slide means mounted on said resolver rotor shaft and slideable in said slot means,
 (c) detent means in said slide means,
 (d) and spring-pressed ball means mounted in said member and normally extending into said detent means.

11. In a control system for a machine:
 (a) a machine base,
 (b) a machine carriage mounted for movement on said base,
 (c) carriage drive means for moving said carriage in a Y direction along said base,
 (d) a tool support mounted for movement on said carriage,
 (e) tool drive means for moving said tool support in an X direction on said carriage,
 (f) a circle generator fixedly mounted on said machine carriage, said generator comprising:
  (1) first and second generator carriage assemblies corresponding to said machine carriage and said tool support respectively, with the said generator carriage assemblies being mounted for movement in Y and X directions which correspond respectively to the Y and X directions of movement of said machine carriage and tool support,
  (2) said generator carriage assemblies forming a pair of parallel axes which are spaced apart a distance corresponding to the length of radius of the circle to be described by the tool support,
  (3) generator drive means connected and disposed to move said generator carriage assemblies in said Y and X directions,
  (4) connector means extending between said generator carriage assemblies and adapted to pivot about both said parallel axes during movement of the assemblies,
  (5) and an electromechanical resolver mounted on one of said assemblies with said resolver having a stator and having a rotor with a rotor shaft indexable in response to pivoting of said connector means about one of said axes,
  (6) feed rate windings and correction windings on said rotor,
  (7) output windings on said stator rseponsive to a signal from either of said rotor windings,
 (g) servo means connecting said machine and said circle generator and comprising:
  (1) a connection between the output windings of said resolver and said drive means (c) and (e) for actuating both said last-named drive means in accordance with the signal at said output windings,
  (2) and feedback means responsive to driving of said machine carriage and tool support by the drive means (c) and (e) and respectively connected to the generator drive means for actuating the latter,
 (h) means for selectively energizing or de-energizing said feed rate windings,
 (i) and means for energizing said correction windings when said feed rate windings are either energized or de-energized.

12. In a control system for a machine:
 (a) a machine base,
 (b) a machine carriage mounted for movement on said base in a Y direction,
 (c) a tool support mounted for movement on said carriage in an X direction,
 (d) an electromechanical circle generator mounted on said carriage and having mechanical elements corresponding to said carriage and tool support,
 (e) mechanical drive means connecting said carriage and tool support with said mechanical elements for moving the elements in correspondence with movement of said carriage and tool support,
 (f) and electromechanical drive means connecting said mechanical elements with said carriage and tool support for moving said carriage and tool support in correspondence with movement of said elements.

13. In the control system of claim 12: means responsive to an error in position of any one of said carriage, tool support and mechanical elements relative to the others for substantially immediately correcting the error.

References Cited
UNITED STATES PATENTS

| | | |
|---|---|---|
| 2,202,131 | 5/1940 | Wagner. |
| 2,907,623 | 10/1959 | Parenti. |
| 3,032,881 | 5/1962 | Fengler. |
| 3,037,760 | 6/1962 | Arnault. |
| 3,119,184 | 1/1964 | Projansky. |
| 3,126,635 | 3/1964 | Muldoon et al. |

HARRY N. HAROIAN, *Primary Examiner.*

U.S. Cl. X.R.
33—23; 266—23